(12) United States Patent
Curry et al.

(10) Patent No.: US 7,357,018 B2
(45) Date of Patent: Apr. 15, 2008

(54) METHOD FOR PERFORMING A MEASUREMENT INSIDE A SPECIMEN USING AN INSERTABLE NANOSCALE FET PROBE

(75) Inventors: Bo U Curry, Redwood City, CA (US); Sungsoo Yi, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/351,515

(22) Filed: Feb. 10, 2006

(65) Prior Publication Data

US 2007/0186628 A1 Aug. 16, 2007

(51) Int. Cl.
*G01B 5/28* (2006.01)
*G01N 23/00* (2006.01)

(52) U.S. Cl. ........................................ 73/105; 250/307

(58) Field of Classification Search ................. 73/105; 250/307

See application file for complete search history.

(56) References Cited

U.S. PATENT DOCUMENTS

| | | | | |
|---|---|---|---|---|
| 5,372,930 A | * | 12/1994 | Colton et al. | 250/306 |
| 5,583,443 A | * | 12/1996 | McMurtry et al. | 324/601 |
| 5,730,940 A | * | 3/1998 | Nakagawa | 422/68.1 |
| 6,159,742 A | * | 12/2000 | Lieber et al. | 436/164 |
| 6,297,063 B1 | * | 10/2001 | Brown et al. | 438/2 |
| 6,465,782 B1 | * | 10/2002 | Kendall | 250/306 |
| 6,803,840 B2 | * | 10/2004 | Kowalcyk et al. | 333/186 |
| 6,852,673 B2 | * | 2/2005 | Baltruschat et al. | 504/256 |
| 6,919,730 B2 | * | 7/2005 | Cole et al. | 324/715 |
| 6,952,952 B2 | | 10/2005 | Hinterdorfer et al. | |
| 6,991,932 B2 | * | 1/2006 | Hidaka et al. | 435/287.2 |
| 7,052,588 B2 | * | 5/2006 | Gu et al. | 204/403.01 |
| 2004/0023253 A1 | * | 2/2004 | Kunwar et al. | 435/6 |
| 2004/0211271 A1 | * | 10/2004 | Han et al. | 73/866.5 |
| 2005/0017171 A1 | * | 1/2005 | Samuelson et al. | 250/306 |
| 2005/0103097 A1 | * | 5/2005 | Faltum et al. | 73/61.41 |
| 2005/0161662 A1 | * | 7/2005 | Majumdar et al. | 257/18 |
| 2006/0097389 A1 | * | 5/2006 | Islam et al. | 257/734 |
| 2006/0226550 A1 | * | 10/2006 | Dai et al. | 257/763 |

OTHER PUBLICATIONS

Stanislaus Wong et al. "Covalently functionalized nanotubes as nanometre-size probes in chemistry and biology" Nature, vol. 394, Jul. 1998, pp. 52-55.*

Fernando Patolsky and Charles Lieber, "Nanowire nanosensors" Materials Today, Apr. 2005, pp. 20-28.*

U. Dammer et al. "Specific Antigen/Antibody Interactions Measured by Force Microscopy" Biophysical Journal, vol. 70, May 1996, pp. 2437-2441.*

(Continued)

*Primary Examiner*—Michael Cygan
(74) *Attorney, Agent, or Firm*—Ian Hardcastle

(57) ABSTRACT

A measurement inside a specimen is performed by providing a nanoscale FET probe comprising a cantilever element and a nanowire extending from the cantilever element. The nanowire is electrically connected to the cantilever element at at least one of the ends of the nanowire. The nanowire is coated along at least part of the length thereof with molecules of a capture agent. The cantilever element is moved to insert the nanowire onto the specimen. An electrical property of the nanoscale FET probe is monitored to detect binding events between the capture agent molecules and an analyte of interest inside the specimen.

8 Claims, 9 Drawing Sheets

OTHER PUBLICATIONS

Stanislaus Wong et al. "Carbon Nanotube Tips: High-Resolution Probes for Imaging Biological Systems" J. Am. Chem. Soc. vol. 120, 1998, pp. 603-604.*

Chin Cheung et al. "Carbon nanotube atomic force microscopy tips: Direct growth by chemical vapor deposition and application to high-resolution imaging" PNAS vol. 97, Apr. 2000, pp. 3809-3813.*

Martin Specht et al. "Simultaneous measurement of tunneling current and force as a function of position through a lipid film on a solid substrate" Surf. Sci. Lett. vol. 257, 1991, pp. L653-L658.*

Genfeng Zheng et al. "Multiplexed electrical detection of cancer markers with nanowire sensor arrays" Nature Biotechnology, vol. 23, Oct. 2005, pp. 1294-1301.*

Robert Chen et al. "Noncovalent functionalization of carbon nanotubes for highly specific electronic biosensors" PNAS Apr. 2003, pp. 4984-4989.*

Thomas Martensson et al. "Epitaxial III-V Nanowires on Silicon" Nano Letters, vol. 4, Sep. 2004, pp. 1987-1990.*

Alfredo Morales and Charles Lieber, "A Laser Ablation Method for the Synthesis of Crystalline Semiconductor Nanowires" Science, vol. 279, Jan. 1998, pp. 208-211.*

Bunimovich, Yuri L. et al., "Electrochemically Programmed, Spatially Selective Biofunctionalization of Silicon Wires", American Chemical Society, Langmuir, 2004, vol. 20, pp. 10630-10638.

Wagner R. S. et al., "Mechanism of Branching and Kinking During VLS Crystal Growth", Solid State Science, Jan. 1968, pp. 93-99.

Stroh, C. et al., "Single-Molecule Recognition Imaging Microscopy", PNAS, Aug. 24, 2004, vol. 101, No. 34, pp. 12503-12507.

Huang, Frank K. et al., "Selenoltes as Alternatives to Thiolates for Self-Assembled Monolayers: A SERS Study", Langmuir 1998, vol. 14, pp. 4802-4808.

Obataya, Ikuo et al., "Nanoscale Operation of a Living Cell Using an Atomic Force Microscope with a Nanoneedle", American Chemical Society, Nano Letter, 2005, vol. 5, No. 1, pp. 27-30.

Kouklin, N.A. et al., "Carbon Nanotube Probes for Single-ell Experimentation and Assays", Applied Physics Letters, 2005, vol. 87, 173901.

Wang, Wayne U. et al., "Label-Free Detection of Small-Molecule-Protein Interactions by Using Nanowire Nanosensors", PNAS, Mar. 1, 2005, vol. 102, No. 9, pp. 3208-3212.

Patolsky, Fernando et al., "Electrical Detection of Single Viruses", PNAS, Sep. 28, 2004, vol. 101, No. 39, pp. 14017-14022.

Shan, Yinghui et al., "From Si Source Gas Directly to Positioned, Electrically Contacted Si Nanowires: The Self-Assembling "Grow-in-Place" Approach", Nano Letters, 2004, vol. 4, No. 11, pp. 2085-2089.

* cited by examiner

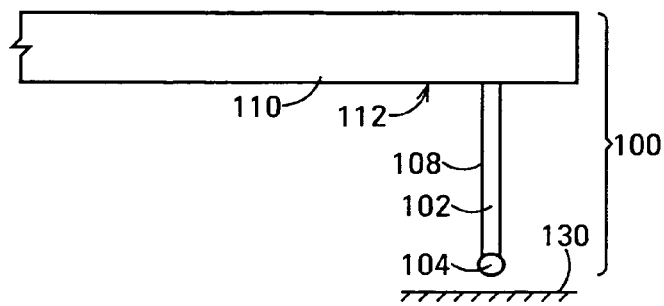
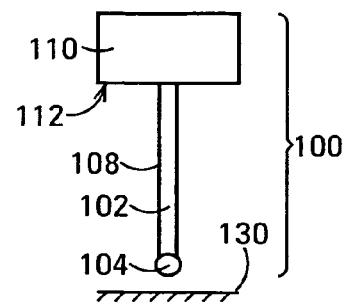
FIG.1A  FIG.1B
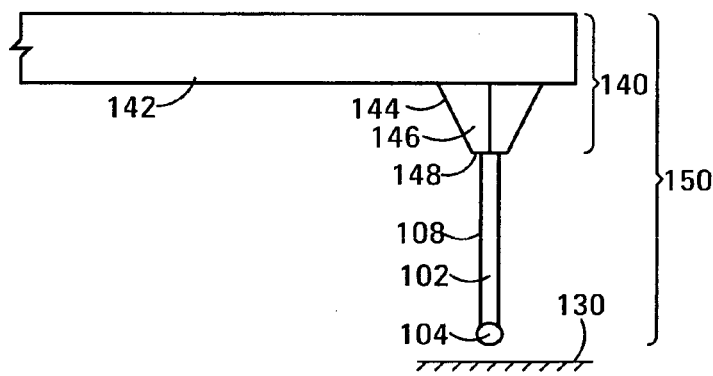
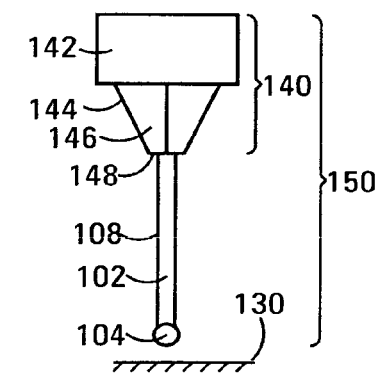
FIG.1C  FIG.1D
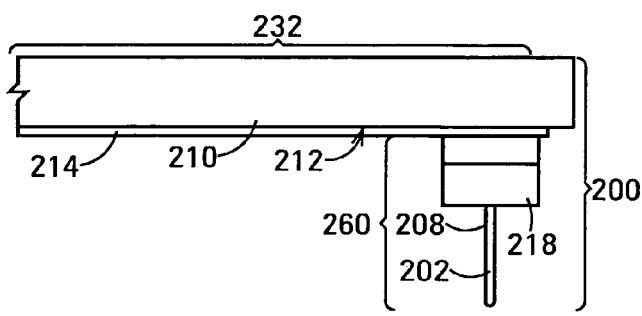
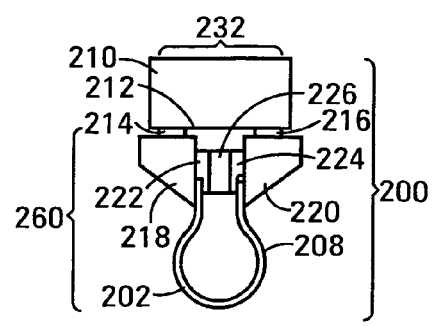
FIG.2A  FIG.2B

METHOD FOR PERFORMING A MEASUREMENT INSIDE A SPECIMEN USING AN INSERTABLE NANOSCALE FET PROBE

RELATED APPLICATIONS

This application is also related to U.S. patent application Ser. No. 11/351,511 of Sungsoo Yi et al. entitled *High Aspect Ratio AFM Probe and Method of Making* and to U.S. patent application Ser. No. 11/352,007 of Ying-Lan Chang et al. entitled *Functionalizable Nanowire-Based AFM Probe*, both filed on the filing date of this application. The above applications are all assigned to the assignee of this application and the disclosures of the above applications are incorporated into this application by reference.

BACKGROUND

The biochemical response of living cells to external stimuli is the focus of active current research. Current methods known in the art usually involve the introduction of modified nucleotides or proteins into the cell. The modified nucleotides or proteins interact with the analytes of interest in the cell to produce an externally-detectable signal, such as a fluorescent signal from green fluorescent protein (GFP) or an activatable label such as a molecular beacon. These methods require that the cell of interest be chemically modified before it can be studied. No currently-known method allows an arbitrary analyte of interest to be monitored in an unmodified living cell.

Moreover, existing methods are typically integrating methods, in that they can monitor the build-up of an analyte of interest. This means that existing methods cannot monitor fluctuations in the concentration of the analyte of interest in real time. What is needed is the ability to measure in real time fluctuation in the concentration of an analyte of interest inside an unmodified living cell.

BRIEF DESCRIPTION OF THE DRAWINGS

Exemplary embodiments of the invention are described below with reference to the following drawings in which like reference numerals indicate corresponding parts throughout the several views. The components shown in the drawings are not to scale.

FIGS. 1A and 1B are respectively a partial side view and an end view showing an example of an insertable nanoscale FET probe in accordance with an embodiment of the invention.

FIGS. 1C and 1D are respectively a partial side view and an end view showing an example of an insertable nanoscale FET probe in accordance with another embodiment of the invention.

FIGS. 2A and 2B are a partial side view and an end view, respectively, showing an example of an insertable nanoscale FET probe in accordance with another embodiment of the invention.

DETAILED DESCRIPTION

Figure 3A:
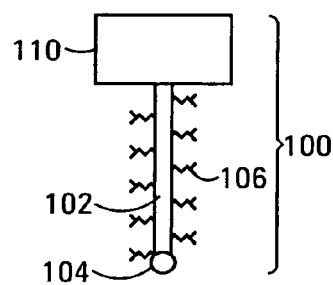
FIGS. 3A-3D schematically illustrate an example of a method in accordance with an embodiment of the invention for performing a measurement inside a specimen performed using the nanoscale FET probe shown in FIGS. 1A and 1B.

A doped silicon nanowire can serve as a nanoscale field effect transistor (FET) whose electrical conductance is sensitive to the presence of charged moieties located adjacent or on the surface of the nanowire. Such a nanoscale FET can be functionalized by attaching molecules of a capture agent specific to an analyte of interest. Typical capture agents include antibodies, oligonucleotides, aptamers and artificial antibodies. Typical analytes of interest include proteins, RNA, DNA and even whole viruses. The conductance of such a functionalized nanoscale FET can be monitored in real time to detect a binding event between a single molecule of the analyte of interest and the capture agent.

A conventional functionalized nanoscale FET is typically a substantially planar structure comprising a source electrode, a drain electrode and a doped silicon nanowire. The electrodes are spatially offset from one another on the surface of a substrate. The silicon nanowire extends along the surface of the substrate from the source electrode to the drain electrode. The silicon nanowire is functionalized with molecules of the capture agent along at least part of its length. The substantially planar structure of the conventional functionalized nanoscale FET prevents such FET from being easily inserted into a living cell.

In accordance with embodiments of the invention, a nanoscale FET probe comprises a cantilever element and, at end of the cantilever element, a nanowire that extends from the cantilever element. The nanowire is electrically connected to the cantilever element at at least one of its ends. The nanowire is capable of being coated with molecules of a capture agent along at least part of its length.

In one embodiment, the nanowire extends from the cantilever element substantially in a straight line and is used in conjunction with an auxiliary conductive surface on which a specimen of interest is located. The nanowire extends through the specimen and the distal end of the nanowire, remote from the cantilever element, electrically contacts the conductive surface. The distal end of the nanowire electrically contacting the conductive surface completes an electrical circuit that includes the nanowire and whose electrical conductance can be monitored to detect binding events between molecules of the analyte of interest inside the specimen and the capture agent molecules coating the nanowire. In this embodiment, the nanowire enters and exits the specimen on opposite sides of the specimen.

In another embodiment, the nanowire is looped and is electrically connected to the cantilever element at both of its ends. The looped nanowire is inserted into the specimen of interest and the electrical conductance of an electrical circuit that includes the looped nanowire is monitored to detect the above-mentioned binding events. In this embodiment, the looped nanowire enters and exits the specimen through the same side of the specimen.

FIGS. 1A and 1B are respectively a partial side view and an end view showing an example of an insertable nanoscale FET probe 100 in accordance with an embodiment of the invention. Nanoscale FET probe 100 is capable of being functionalized with molecules of a capture agent and of being inserted into a specimen to make measurements inside the specimen. Nanoscale FET probe 100 is composed of a cantilever element 110 and a doped semiconductor nanowire 102 that extends from the cantilever element at one end of the cantilever element. A nanowire that extends from the cantilever element from a point closer to one end of the cantilever element than to the middle of the cantilever element will be regarded as extending from one end of the cantilever element. In this embodiment, nanowire 102 is substantially straight and is electrically connected at its proximal end to cantilever element 110. Nanowire 102 has a catalyst nanoparticle 104 located at its distal end, remote from cantilever element 110, as a result of the process used to fabricate nanowire 102, as will be described in more detail below with reference to FIGS. 5A-5H. Nanowire 102 has a lateral surface 108 that can be coated with molecules of a capture agent to functionalize nanoscale FET probe 100.

In the example shown, cantilever element 110 is an elongate piece of doped single-crystal semiconductor material fabricated such that one of the crystalline planes of the semiconductor material coincides with an external surface 112 of the cantilever element. External surface 112 of cantilever element 110 provides a crystalline growth surface from which semiconductor nanowire 102 is epitaxially grown. Hence, external surface 112 will be referred to as growth surface 112. Cantilever element 110 is attached to a host AFM microscope (not shown) at or adjacent its end (not shown) remote from the end at which nanowire 102 is located.

As a result of its epitaxial growth, nanowire 102 extends substantially orthogonally from the growth surface 112 of cantilever element 110, i.e., nanowire 102 extends in a direction typically within ±10° of the direction orthogonal to growth surface 112. In an embodiment, growth surface 112 is substantially parallel to the longitudinal axis of cantilever element 110, i.e., growth surface 112 is parallel to the longitudinal axis of cantilever element 110 typically within ±10°. In a typical embodiment, nanowire 102 is of the order of 100 nm in diameter and 10 μm in length, and the diameter of catalyst nanoparticle 104 is similar to that of the nanowire. In other embodiments, either or both of the diameter and the length of nanowire 102 differ from those exemplified above.

The material of semiconductor nanowire 102 is a single-crystal semiconductor material, such as a single-crystal group IV semiconductor, e.g., silicon (Si); a single-crystal group III-V semiconductor, e.g., gallium arsenide (GaAs); or a single-crystal group II-VI semiconductor, such as zinc oxide (ZnO). The single-crystal semiconductor material of nanowire 102 is doped with a suitable dopant to make nanowire 102 electrically conducting. In a typical embodiment, the semiconductor material of nanowire 102 is doped silicon and the material of lateral surface 108 is silicon dioxide ($SiO_2$). Lateral surface 108 of silicon dioxide facilitates the adhesion of capture agent molecules (not shown) to nanowire 102.

In a typical embodiment, a tipless, monolithic, single-crystal semiconductor AFM probe is used as cantilever element 110. Such tipless, monolithic, single-crystal semiconductor AFM probes are sold by Nano World AG of Neuchâtel, Switzerland. Such a tipless AFM probe is a single piece of single-crystal silicon in which one of the major crystalline planes of the silicon coincides with growth surface 112. In embodiments in which cantilever element 110 is electrically conducting, the single-crystal silicon is doped with a suitable dopant such as arsenic. In other embodiments (not shown), the material of the cantilever element is not a semiconductor. In such embodiments, the cantilever element has at one end a layer of crystalline semiconductor material on at least part of one of its external surfaces. The exposed surface of the semiconductor material provides crystalline growth surface 112 from which nanowire 102 extends. In embodiments in which the material of cantilever element 110 is not electrically conducting, an electrically-conducting trace (not shown) extends along the cantilever element to make electrical contact with nanowire 102. A nanowire that is directly or indirectly electrically connected at one of its ends to an electrical trace that extends along a cantilever element will be regarded as being electrically connected to the cantilever element at such one of its ends.

As will be described in more detail below, using nanoscale FET probe 100 to perform a measurement inside a specimen involves the use of an auxiliary conductive surface 130 on which the specimen is placed. Nanoscale FET probe 100 is moved to insert nanowire 102 into the specimen and to bring catalyst nanoparticle 104 into electrical contact with conductive surface 130. Electrical contact between catalyst nanoparticle 104 and conductive surface 130 completes an electrical circuit that includes nanowire 102. The conductivity of the electrical circuit is monitored to detect binding events between molecules of an analyte of interest inside the specimen and capture agent molecules (not shown) disposed along the length of nanowire 102.

FIGS. 1C and 1D are respectively a partial side view and an end view showing an example of an insertable nanoscale FET probe 150 in accordance with another embodiment of the invention. Nanoscale FET probe 150 is capable of being functionalized with molecules of a capture agent and is capable of being inserted into a specimen to make measurements therein. Nanoscale FET probe 150 is similar to FET probe 100 described above with reference to FIGS. 1A and 1B but differs in the structure of its cantilever element. Nanoscale FET probe 150 is composed of a cantilever element 140 and doped semiconductor nanowire 102, described above, that extends from the cantilever element at one end of the cantilever element.

Cantilever element 140 is composed of a cantilever arm 142 and a frusto-pyramidal probe tip base 144 located at one end of cantilever arm 142. As used in this disclosure, the term frusto-pyramidal encompasses frusto-conical, a cone being a pyramid having a base with an infinite number of sides. A probe tip base that is closer to one end of cantilever arm 142 than to the middle of cantilever arm 142 will be regarded as being at one end of cantilever arm 142. Cantilever arm 142 is attached to host AFM microscope 120 (FIG. 3B) at or adjacent its end (not shown) remote from the end where probe tip base 144 is located.

Probe tip base 144 has crystalline side facets, an exemplary one of which is shown at 146, and, at its distal end remote from cantilever arm 142, a crystalline end facet 148. In this first embodiment, end facet 148 provides a crystalline growth surface from which nanowire 102 extends substantially orthogonally. End facet 148 is substantially parallel to cantilever arm 142, i.e., end facet 148 is parallel to cantilever arm 142 typically within ±10°. End facet 148 is typically less than about 0.01 µm² in area.

In a typical embodiment, a monolithic, a single-crystal semiconductor AFM probe having a frusto-pyramidal single-crystal silicon probe tip is used as cantilever element 140. Such monolithic, single-crystal semiconductor AFM probes are sold by Nano World AG of Neuchâtel, Switzerland. In such an AFM probe, the cantilever arm and probe tip are respective portions of a single piece of single-crystal silicon. In embodiments in which cantilever element 140 is electrically conducting, as is typically the case, the single-crystal silicon is doped with a suitable dopant such as arsenic. In other embodiments, cantilever arm 142 and probe tip base 144 are separate components joined together. In such embodiments, the material of cantilever arm 142 need not be a semiconductor.

Nanowire 102 extends substantially orthogonally from crystalline end facet 148 at the distal end of probe tip base 144, i.e., nanowire 102 extends in a direction typically within ±10° of the direction orthogonal to end facet 148. A process for growing nanowire 102 on end facet 148 is described by Yi et al. in U.S. patent application Ser. No. 11/351,511 entitled *High Aspect Ratio AFM Probe and Method of Making*, assigned to the assignee of this disclosure and incorporated by reference.

As will be described in more detail below, operation of nanoscale FET probe 150 also involves the use of auxiliary conductive surface 130 on which the specimen to be measured is placed.

FIGS. 2A and 2B are a partial side view and an end view, respectively, showing an example of an insertable nanoscale FET probe 200 in accordance with another embodiment of the invention. Nanoscale FET probe 200 is capable of being functionalized with molecules of a capture agent and of being inserted into a specimen to make measurements inside the specimen. Nanoscale FET 200 is composed of a cantilever element 210 and a doped semiconductor nanowire 202 that extends from the cantilever element at one end of the cantilever element. A nanowire that extends from the cantilever element from a point closer to one end of the cantilever element than to the middle of the cantilever element will be regarded as extending from one end of the cantilever element. In this embodiment, nanowire 202 is looped and is electrically connected at both of its ends to locations on cantilever element 210 that are electrically isolated from one another. Nanowire 202 has a lateral surface 208 that can be coated with molecules of a capture agent to functionalize nanoscale FET probe 200.

The material of looped semiconductor nanowire 202 is a single-crystal semiconductor material, such as a single-crystal group IV semiconductor, e.g., silicon (Si); a single-crystal group III-V semiconductor, e.g., gallium arsenide (GaAs); or a single-crystal group II-VI semiconductor, such as zinc oxide (ZnO). The single-crystal semiconductor material of nanowire 202 is doped with a suitable dopant to make nanowire 202 electrically conducting. In a typical embodiment, the material of nanowire 202 is silicon and the material of lateral surface 208 is silicon dioxide ($SiO_2$). Lateral surface 208 of silicon dioxide facilitates the adhesion of capture agent molecules (not shown) to nanowire 202.

In the example shown, cantilever element 210 is an elongate piece of single-crystal semiconductor material substantially as described above. In a typical embodiment, a tipless, monolithic, single-crystal semiconductor AFM probe, described above, is adapted for use as cantilever element 210. Electrically-conducting traces 214 and 216 extend lengthways along cantilever element 210 on surface 212. Surface 212 is electrically insulating to provide electrical isolation between traces 214 and 216.

In the example shown, looped nanowire 202 constitutes part of an insertable nanoscale FET element 260 located at one end of cantilever element 218. Nanoscale FET element 260 is additionally composed of mounting blocks 218 and 220, electrodes 222 and 224 and an insulator 226. The ends of looped nanowire 202 are electrically connected to electrodes 222 and 224, respectively. Insulator 226 is located between electrodes 222 and 224. Insulator 226 mechanically couples electrodes 222 and 224 to one another but electrically isolates electrodes 222 and 224 from one another. Electrodes 222 and 224 are located on respective surfaces of electrically-conducting mounting blocks 218 and 220, respectively. Nanoscale FET element 260 is mounted on cantilever element 210 with the surfaces of mounting blocks 218 and 220 orthogonal to the surfaces on which electrodes 222 and 224 are located in electrical contact with electrical traces 214 and 216 and with mounting blocks 218 and 220 mechanically bonded to the surface 212 of cantilever element 210. Electrical traces 214 and 216 provide electrical connections to nanoscale FET element 260 that allow the electrical conductance of nanowire 202 to be measured, as will be described below.

In a method in accordance with an embodiment of the invention for performing a measurement inside a specimen, a nanoscale FET probe is provided. The nanoscale FET probe comprises a cantilever element and a semiconductor nanowire that extends from the cantilever element. The nanowire is electrically connected to the cantilever element at at least one of the ends of the nanowire. The semiconductor nanowire is coated along at least part of its length with molecules of a capture agent. The cantilever element is moved to insert the nanowire into the specimen. The electrical conductance of the functionalized nanowire is then monitored to detect binding events between the capture agent molecules and molecules of an analyte of interest inside the specimen.

FIGS. 3A-3D schematically illustrate an example of the above-described method performed using nanoscale FET probe 100 described above with reference to FIGS. 1A and 1B. The method could equally well be performed using nanoscale FET probe 150 described above with reference to FIGS. 1C and 1D, so an example of the method performed using nanoscale FET probe 150 will not be separately described.

Nanoscale FET probe 100 is functionalized by coating lateral surface 108 of semiconductor nanowire 102 along at least part of its length with molecules of a capture agent, as shown in FIG. 3A. An exemplary capture agent molecule is shown at 106. Reference numeral 106 will additionally be used to refer to the capture agent molecules collectively. In an embodiment, nanoscale FET probe 100 is functionalized by dipping nanowire 102 into a solution of the capture agent molecules, withdrawing the nanowire from the solution and allowing the nanowire to dry. Examples of capture agents include antibodies, oligonucleotides, aptamers and artificial antibodies. Many coating methods are known in the art and may alternatively be used to functionalize nanowire 102. Coating methods involving covalent attachments are especially suitable for functionalizing the nanowire with nucleotides. As noted above, lateral surface 108 comprises a material that facilitates adhesion of the capture agent molecules to nanowire 102.

Figure 3B:
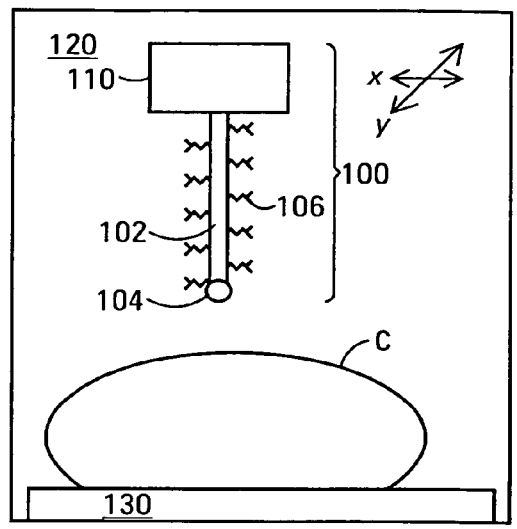
Figure 3C:
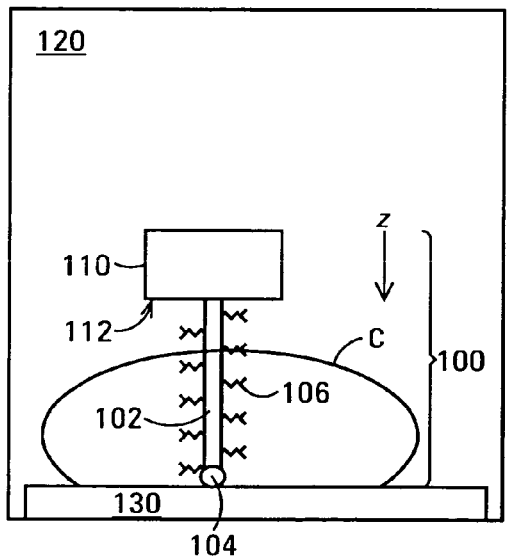

The cantilever element is moved to insert the nanowire into the specimen, as shown in FIGS. 3B and 3C. In an embodiment, the end (not shown) of cantilever element 110 remote from nanowire 102 is mounted in a host atomic force microscope (AFM), represented by the block labelled 120, and the above-described operation is performed by operating AFM 120. In the example shown in FIGS. 3B-3D, the specimen in which measurements are to be performed is a cell C. Cell C is located on auxiliary conductive surface 130 that, in the example shown, constitutes a fixed part of AFM 120. In an example, conductive surface 130 is the surface of a layer of gold supported by a substrate (not separately shown) of a semiconductor material, a ceramic material, glass, silicon dioxide ($SiO_2$) or another suitable material. FIG. 3B shows AFM 120 being operated to move cantilever element 110 in the x- and y-directions parallel to conductive surface 130 to align nanowire 102 with a location of interest inside cell C.

FIG. 3C shows AFM 120 being operated to move cantilever element 110 in the z-direction, orthogonal to conductive surface 130. Moving cantilever element 110 in the z-direction first causes catalyst nanoparticle 104 on the distal end of nanowire 102 to penetrate the membrane of cell C. Further movement of the cantilever element in the z-direction inserts nanowire 102 and capture agent molecules 106 into the cell. Finally, movement of the cantilever element in the z-direction causes catalyst nanoparticle 104 to penetrate the membrane of cell C a second time and brings catalyst nanoparticle 104 into physical contact, and, hence, electrical contact, with conductive surface 130. Penetration by catalyst nanoparticle 104 at the distal end of nanowire 102 of the membrane of cell C with minimal disruption of the membrane is facilitated by applying an electric charge to the nanowire. This technique is known to the art, especially in techniques used for patch-clamping, which involves inserting a glass pipette tip into a cell.

An electrical property of the nanoscale FET probe is then monitored to detect binding events between the capture agent molecules and an analyte of interest inside the specimen. Catalyst nanoparticle 104 contacting conductive surface 130 establishes an electrical circuit 132 that includes cantilever element 110, nanowire 102, catalyst nanoparticle 104 and conductive surface 130. Electrical circuit 132 has an electrical conductance that depends in part on the electrical conductance of nanowire 102 that constitutes part of nanoscale FET probe 100. The electrical conductance of nanowire 102 in turn depends on whether binding has taken place between molecules of an analyte of interest inside cell C and capture agent molecules 106 coating the nanowire.

Figure 3D:
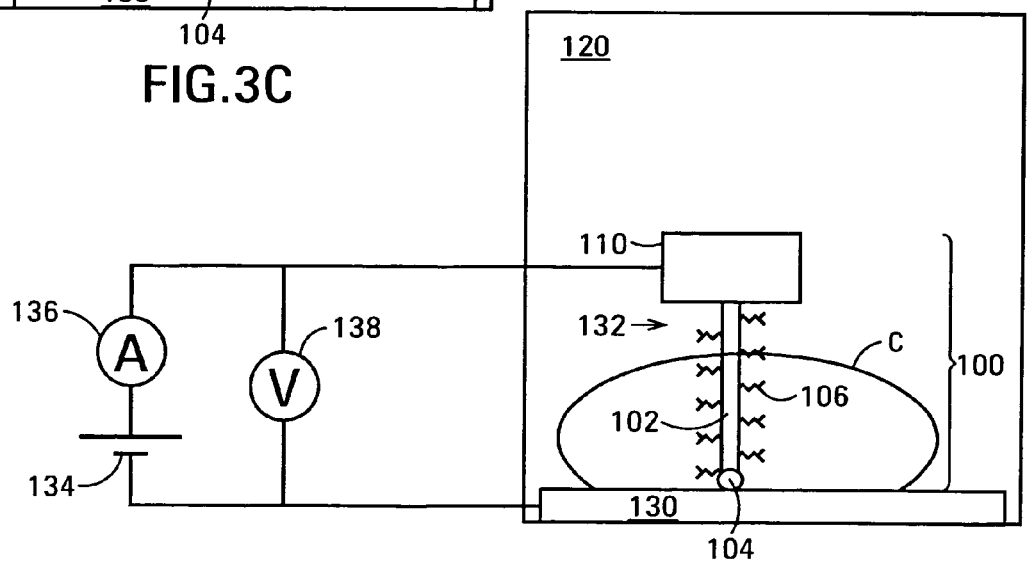

FIG. 3D shows a voltage source 134 and a current meter 136 connected in series with electrical circuit 132, and a voltmeter 138 connected in parallel with electrical circuit 132. If the output voltage of voltage source 134 is accurately known, voltmeter 138 can be omitted. Changes in the conductance of nanoscale FET probe 100 due to the molecules of an analyte of interest binding to capture agent molecules 106 are manifested as changes in the current indicated by current meter 136.

In an alternative configuration, a current source (not shown) providing a known current is connected in series with electrical circuit 132 and voltmeter 138 is connected in parallel with electrical circuit 132. Changes in the conductance of nanoscale FET probe 100 due to molecules of an analyte of interest binding to capture agent molecules 106 are manifested as changes in the voltage indicated by voltmeter 138.

Regardless of the way in which the conductance of nanoscale FET probe 100 is measured, a single molecule of an analyte of interest binding to one of the capture agent molecules 106 will produce a change the conductance of nanoscale FET probe 100 that is measurable in real time as the binding event occurs.

In the above example, the function of monitoring an electrical property of nanoscale FET probe 100 to detect binding events between capture agent molecules 106 and an analyte of interest inside the specimen is performed by voltage source 134, current meter 136 and voltmeter 138 monitoring the conductance of nanoscale FET probe 100. However, any electrical property of nanoscale FET probe 100 that depends on binding between capture agent molecules 106 and an analyte of interest inside the specimen may be monitored. Moreover, such electrical property of nanoscale FET probe 100 may be monitored using apparatus different from voltage source 134, current meter 136 and voltmeter 138 exemplified above. Such electrical properties and apparatus for monitoring such properties are known in the art and will therefore not be described here. The variation of such electrical property of nanoscale FET probe 100 with time may additionally be monitored to gather additional information regarding the analyte of interest.

FIGS. 4A-4D schematically illustrate an example of the above-described method performed using nanoscale FET probe 200 described above with reference to FIGS. 2A and 2B.

Figure 4A:
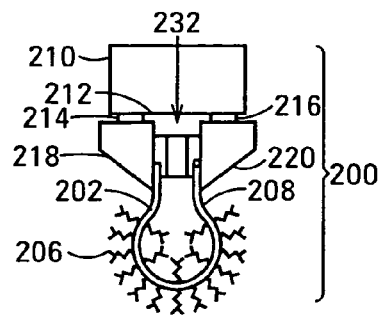
FIGS. 4A-4D schematically illustrate an example of a method in accordance with an embodiment of the invention for performing a measurement inside a specimen performed using the nanoscale FET probe shown in FIGS. 2A and 2B.

Nanoscale FET probe 200 is functionalized by coating lateral surface 208 of semiconductor nanowire 202 with molecules of a capture agent, as shown in FIG. 4A. An exemplary capture agent molecule is shown at 206. Reference numeral 206 will additionally be used to refer to the capture agent molecules collectively. In an embodiment, nanoscale FET probe 200 is functionalized by dipping nanowire 202 into a solution of the capture agent molecules, withdrawing the nanowire from the solution and allowing the nanowire to dry. Examples of capture agents include antibodies, oligonucleotides, aptamers and artificial antibodies. Other techniques for functionalizing a nanowire are known in the art and may be used. As noted above, lateral surface 208 comprises a material that facilitates adhesion of the capture agent molecules to nanowire 202.

Figure 4B:
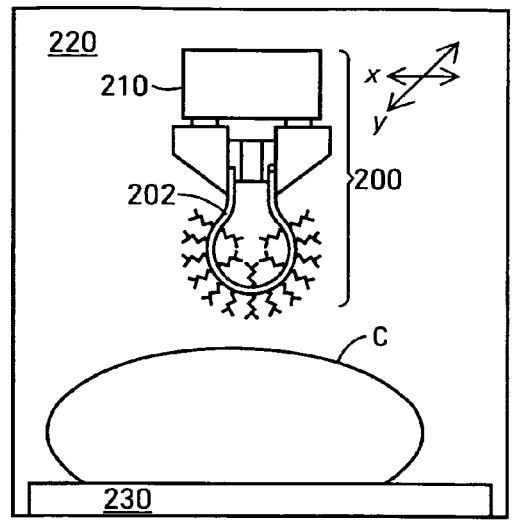
Figure 4C:
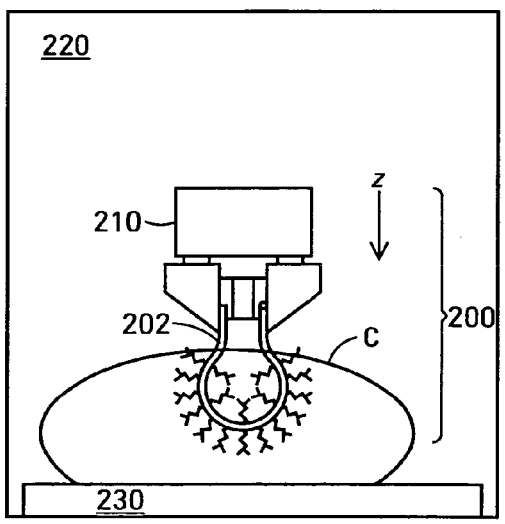

The cantilever element is moved to insert the nanowire into the specimen, as shown in FIGS. 4B and 4C. In an embodiment, the end (not shown) of cantilever element 210 remote from nanowire 202 is mounted in a host atomic force microscope (AFM), represented by a block labelled 220, and the above-described operation is performed by operating AFM 220. In the example shown in FIGS. 4B-4D, the specimen in which measurements are to be performed is a cell C. Cell C is located on a fixed surface 230 that constitutes part of AFM 220. In this embodiment, surface 230 need not be electrically conductive, although an electrically-conductive surface similar to above-described conductive surface 130 will provide some electrical shielding for nanoscale FET probe 200. FIG. 4B shows AFM 220 operated to move cantilever element 210 in the x- and y-directions parallel to fixed surface 230 to align nanowire 202 with a location of interest inside cell C, but offset from this location in the z-direction.

FIG. 4C shows AFM 220 operated to move cantilever element 210 in the z-direction, orthogonal to fixed surface 230. Moving cantilever element 210 in the z-direction first causes a region of nanowire 202 remote from cantilever element 210 to penetrate the membrane of cell C. Further movement of the cantilever element in the z-direction positions nanowire 202 and capture agent molecules 206 at the location of interest inside cell C. Penetration by nanowire 202 of the membrane of cell C with minimal disruption of the membrane is facilitated by applying an electric charge to the nanowire, as described above.

An electrical property of the nanoscale FET probe is then monitored to detect binding events between the capture agent molecules and an analyte of interest inside the specimen. Additionally referring to FIGS. 2A and 2B, an electrical circuit 232 extends between the ends of electrical traces 214 and 216 remote from nanowire 202 and includes electrical traces 214 and 216, mounting blocks 218 and 220, electrodes 222 and 224 and nanowire 202. Electrical circuit 232 has an electrical conductance that depends in part on the electrical conductance of nanowire 202. The electrical conductance of nanowire 202 in turn depends on whether binding has taken place between molecules of an analyte of interest and capture agent molecules 206 coating the nanowire.

Figure 4D:
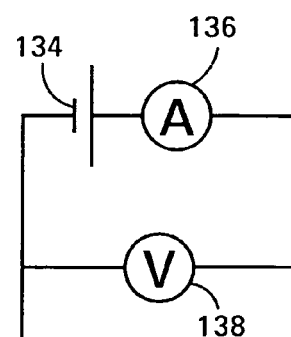
Figure 4D:
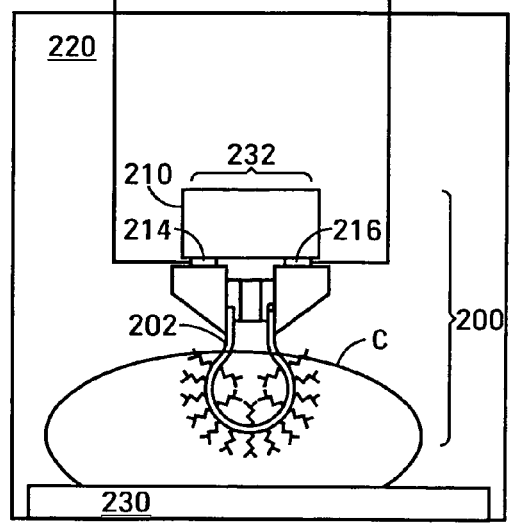

FIG. 4D shows voltage source 134 and current meter 136 connected in series with electrical circuit 232, and voltmeter 138 connected in parallel with electrical circuit 232. The connections to electrical circuit 232 are made to the ends of electrical traces 214 and 216 remote from nanowire 202. As noted above, if the output voltage of voltage source 134 is accurately known, voltmeter 138 can be omitted. Changes in the conductance of nanoscale FET probe 200 due to the molecules of an analyte of interest binding to capture agent molecules 206 are manifested as changes in the current indicated by current meter 136.

In an alternative configuration, a current source (not shown) providing a known current is connected in series with electrical circuit 232 and voltmeter 138 is connected in parallel with electrical circuit 232. Changes in the conductance of nanoscale FET probe 200 due to molecules of an analyte of interest binding to capture agent molecules 206 are manifested as changes in the voltage indicated by voltmeter 138.

Regardless of the way in which the conductance of nanoscale FET probe 200 is measured, a single molecule of an analyte of interest binding to one of the capture agent molecules 206 will produce a change the conductance of nanoscale FET probe 200 that is measurable in real time as the binding event occurs.

In the above example, the function of monitoring an electrical property of nanoscale FET probe 200 to detect binding events between capture agent molecules 206 and an analyte of interest inside the specimen is performed by voltage source 134, current meter 136 and voltmeter 138 monitoring the conductance of nanoscale FET probe 200. However, any electrical property of nanoscale FET probe 200 that depends on binding between capture agent molecules 206 and an analyte of interest inside the specimen may be monitored. Moreover, such electrical property of nanoscale FET probe 200 may be monitored using apparatus different from voltage source 134, current meter 136 and voltmeter 138 exemplified above. Such electrical properties and apparatus for monitoring such properties are known in the art and will therefore not be described here. The variation of such electrical property of nanoscale FET probe 200 with time may additionally be monitored to gather additional information regarding the analyte of interest.

An example of a method in accordance with an embodiment of the invention for making an embodiment of nanoscale FET probe 100 will be described next with reference to FIGS. 5A-5H.

Figure 5A:
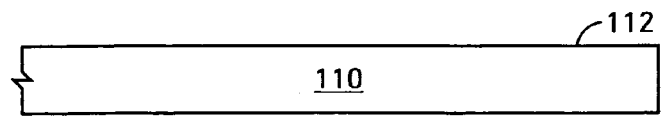
FIGS. 5A-5H schematically illustrate an example of a method in accordance with an embodiment of the invention for making an embodiment of the nanoscale FET probe shown in FIGS. 1A and 1B.

A cantilever element having a crystalline growth surface at one end is provided. FIG. 5A shows an embodiment of cantilever element 110 in which the material of cantilever element is a single-crystal semiconductor and cantilever element 110 has a growth surface 112 that coincides with one of the major crystalline planes of the semiconductor material. FIG. 5A shows only a portion of cantilever element 110 adjacent the end where a nanowire will later be grown to enable the nanowire to be shown in more detail.

As noted above, a conventional tipless monolithic single-crystal semiconductor AFM probe is typically used as cantilever element 110. Such conventional AFM probes can be commercially supplied mounted in the wafer of single-crystal silicon in which they are defined. Thus, cantilever elements including cantilever element 110 can be commercially supplied mounted in the wafer of single-crystal silicon (not shown) in which they are defined. This wafer will be referred to as a probe wafer. The cantilever elements are joined to the probe wafer by narrow beams (not shown) that extend from each cantilever element to the remainder of the probe wafer. Many nanoscale FET probes similar to nanoscale FET probe 100 are fabricated at a time by subjecting a probe wafer in which cantilever elements are defined to the processing described below with reference to FIGS. 5B-5H. Such wafer-scale fabrication makes the nanoscale FET probes inexpensive to fabricate. Alternatively, the processing described herein with reference to FIGS. 5A-5H may be adapted to make small batches of nanoscale FET probes similar to nanoscale FET probe 100 from the cantilever elements supplied mounted in a portion of a full probe wafer, or to make individual instances of nanoscale FET probe 100.

FIGS. 5A-5H illustrate, and the following description describes, the fabrication of nanoscale FET probe 100 on a portion of the probe wafer (not shown) constituting cantilever element 110. As nanoscale FET probe 100 is fabricated, nanoscale FET probes similar to nanoscale FET probe 100 are fabricated on the remaining cantilever elements in the probe wafer.

In the example shown, cantilever element 110 is a single piece of single-crystal silicon. In a specific example, a tipless monolithic single-crystal AFM probe sold by Nano World AG is used as cantilever element 110. Growth surface 112 is substantially parallel to cantilever element 110, as defined above, and is typically the [111] crystalline plane of the silicon of the cantilever element. A group IV or group III-V semiconductor nanowire grown on the [111] crystalline plane of silicon will grow epitaxially, i.e., the crystallographic orientation of the semiconductor material at growth surface 112 imposes a specific crystallographic orientation on the nanowire, and the nanowire will grow in a direction substantially orthogonal to the crystalline plane. Hence, nanowire 102 that later will be grown on the growth surface 112 of cantilever element 110 will extend substantially orthogonally from the growth surface, and, hence, will additional extend substantially orthogonally to cantilever element 110. In other embodiments, growth surface 112 of cantilever arm is a [100] or a [110] crystalline plane, although it is more difficult to grow a silicon nanowire with good material quality on such crystalline planes of silicon than on the [111] crystalline plane. However, the [100] crystalline plane and/or the [110] crystalline plane can give better material quality than the [111] crystalline plane in a nanowire grown from a semiconductor material other than silicon.

Figure 5B:
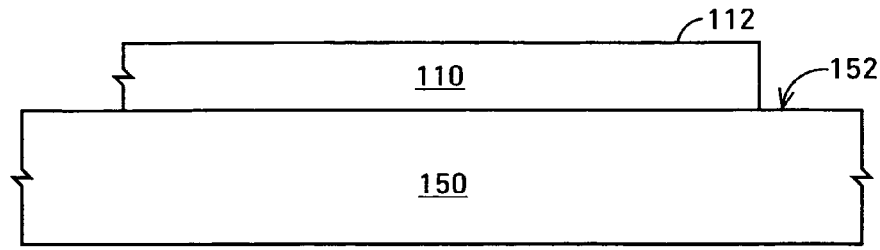

The probe wafer in which the cantilever elements including cantilever element 110 are supplied typically has apertures extending between its major surfaces. The apertures make the probe wafer incompatible with the vacuum chucks used in some of the processes described below. At least to remedy this incompatibility, the probe wafer is temporarily mounted on the major surface 152 of a handle wafer 150 with growth surface 112 facing away from major surface 152, as shown in FIG. 5B. Handle wafer 150 is a wafer of conventional thickness, i.e., about 0.5 mm. In the following description, processes described as being applied to the handle wafer are applied to the handle wafer and all elements currently supported by the handle wafer. Additionally, operations described as being applied to the probe wafer are applied to the probe wafer, the cantilever elements defined in the probe wafer and all layers currently supported by the probe wafer.

In an embodiment, handle wafer 150 is a wafer of single-crystal silicon and the probe wafer is temporarily attached to the handle wafer using clips (not shown). Alternative handle wafer materials include ceramics, sapphire and other suitable materials. In another embodiment, cantilever elements similar to cantilever element 110 are supplied temporarily mounted on a handle wafer.

Figure 5C:
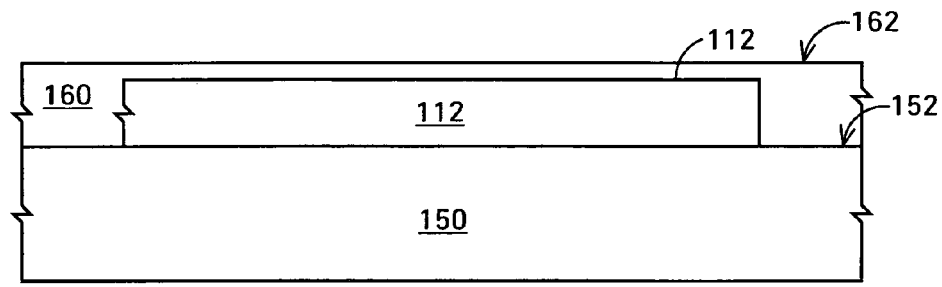
Figure 5D:
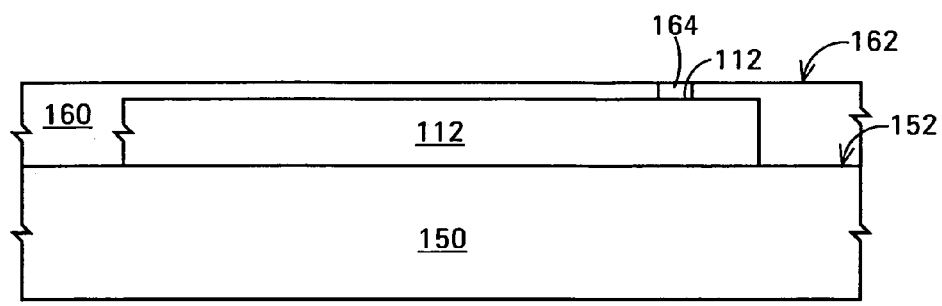

The cantilever element is covered with sacrificial material leaving at least part of the growth surface exposed. FIG. 5D shows a sacrificial layer 160 of sacrificial material covering cantilever element 110 leaving growth surface 112 exposed. Sacrificial layer 160 has a nominal thickness greater than the distance from handle wafer surface 152 to growth surface 112 so that the sacrificial layer initially covers growth surface 112, as shown in FIG. 5C. A portion of the sacrificial material is then removed to form a window 164 that exposes at least part of growth surface 112, as shown in FIG. 5D. Directional reactive ion etching or another etching technique can be used to remove any residual sacrificial material remaining on growth surface 112 after the growth surface has been exposed.

In an embodiment, the sacrificial material of sacrificial layer 160 was photoresist. The photoresist was deposited on the probe wafer by spin coating to cover cantilever element 110. The viscosity of the sacrificial material and the spin speed were set to obtain a nominal layer thickness sufficient to cover growth surface 112 with a layer having a nominal thickness of about 100 nm. Other sacrificial materials that are compatible with the subsequently-performed processing and that can be applied in a manner that produces a planar surface 162 are known in the art and may alternatively be used.

As a further alternative, a layer of a material that covers underlying elements conformally may be deposited with a thickness sufficient to cover growth surface 112 to provide sacrificial layer 160. An example of a conformally-covering material is silicon dioxide ($SiO_2$) deposited by chemical vapor deposition (CVD).

A portion of the sacrificial layer is then selectively removed to form window 164 that exposes at least part of growth surface 112. The portion of sacrificial layer 160 subject to removal to form window 164 is defined by electron beam lithography. Other lithographic techniques such as nanoimprint lithography are known in the art and may alternatively be used. The size of window 164 determines the size of the catalyst metal (174 in FIG. 5E) deposited on growth surface 112 and, hence, the diameter of the subsequently-grown nanowire. In an embodiment, window 164 was circular and had a diameter in the range from about 5 nm to about 20 nm. In an embodiment in which photoresist used as sacrificial layer 160, the portion removed to form window 164 was removed by subjecting the probe wafer to the appropriate developer.

In an embodiment in which the material of sacrificial layer 160 was silicon dioxide, the portion removed to form window 164 was removed by subjecting the probe wafer to a wet etch process using dilute hydrofluoric acid (HF) as etchant.

The processing described above with reference to FIGS. 5C and 5D typically leaves growth surface 112 covered by a thin layer of native silicon dioxide that, if left in place, would hinder the epitaxial growth of nanowire 102 (FIG. 1A) on growth surface 112. Accordingly, such native oxide layer is removed by subjecting growth surface 112 to an etchant that dissolves silicon dioxide.

In an embodiment, the layer of native silicon dioxide was removed from growth surface 112 by subjecting the probe wafer to a wet etch process using dilute hydrofluoric acid (HF) as the etchant. In another embodiment, the layer of native silicon dioxide was removed by subjecting the probe wafer to a dry etch process using HF vapor as the etchant.

Figure 5E:
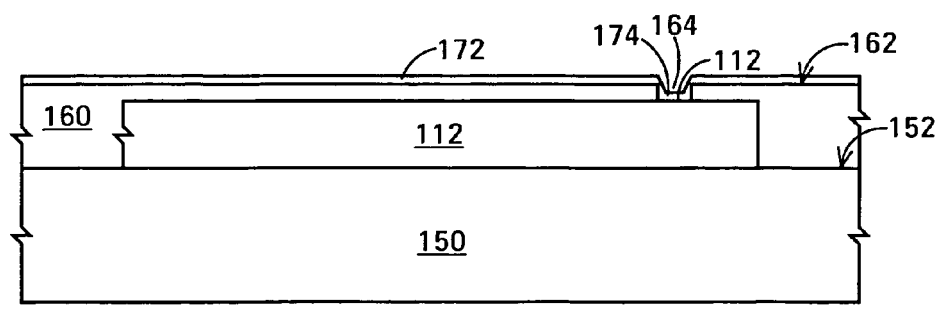

Catalyst metal suitable for catalyzing a vapor-liquid-solid nanostructure growth process is then deposited on the growth surface. FIG. 5E shows a layer 172 of catalyst metal deposited on the surface 162 of sacrificial layer 160 and on the portion of the growth surface 112 of cantilever element 110 exposed by window 164 defined in sacrificial layer 160. The portion of layer 172 deposited on the exposed portion of growth surface 112 is indicated by reference numeral 174.

The material of catalyst metal layer 172 is a metal capable of catalytically decomposing a gaseous precursor to release a respective constituent element of the semiconductor material of nanowire 102 (FIG. 1A). Typical catalyst metals are gold (Au), nickel (Ni), palladium (Pd) and titanium (Ti).

In an embodiment, catalyst metal layer 172 is deposited using electron beam evaporation. Catalyst metal layer 172 may alternatively be deposited by a conventional electroplating process or an electroless plating process.

In another embodiment, galvanic displacement is used to deposit catalyst metal selectively on growth surface 112. In an example in which the catalyst metal is gold, an electrical connection is made to cantilever element 110 via handle wafer 150, and the probe wafer is placed in a solution of gold potassium cyanide ($AuK(CN)_2$) or another suitable electrolyte. A suitable anode is also placed in the electrolyte and a current is passed through the electrolyte between the anode and the probe wafer. The silicon of growth surface 112 acts as a reducing agent and the catalyst metal is selectively deposited on the growth surface through a redox mechanism.

Figure 5F:
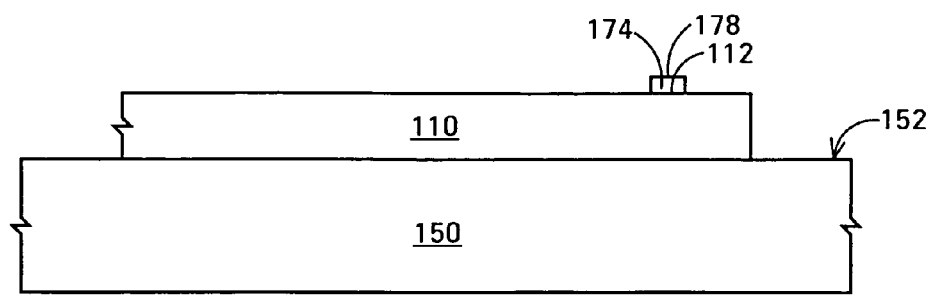

The sacrificial material is then removed. Removing the sacrificial material leaves the catalyst metal deposited on the growth surface. FIG. 5F shows cantilever element 110 and handle wafer 150 after sacrificial layer 160 (FIG. 5D) has been removed. Removing sacrificial layer 160 removes the portion of catalyst metal layer 172 located on the surface 162 of the sacrificial layer, but leaves catalyst metal 174 located on the exposed portion of growth surface 112.

In an embodiment, sacrificial layer 160 of photoresist is removed by a lift-off process in which the probe wafer is immersed in acetone (($CH_3)_2CO$). Sacrificial layer 160 of silicon dioxide may be removed by subjecting the probe wafer to a wet etch process in which dilute hydrofluoric acid (HF) is used as etchant.

Catalyst metal 174 may alternatively be deposited by depositing nanoparticles of the catalyst metal on surface 162 and the exposed portion of growth surface 112. The nanoparticles are deposited with an area density such that more than zero but fewer than two nanoparticles are located on the exposed portion of growth surface 112.

Figure 5G:
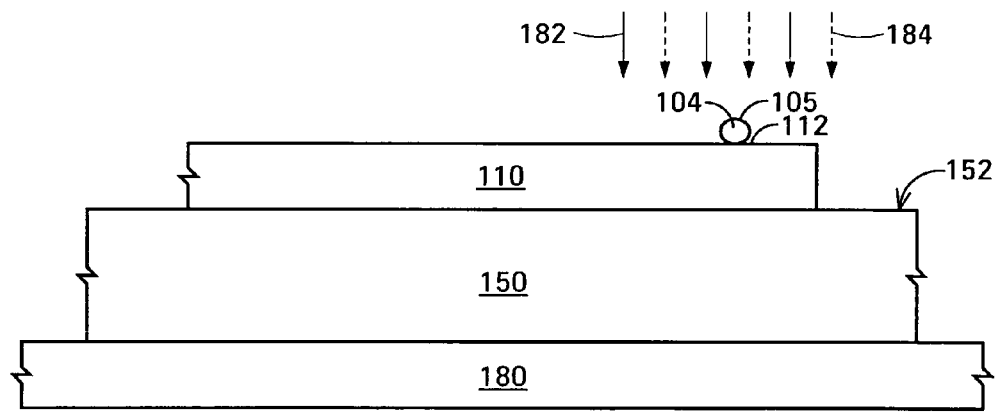
Figure 5H:
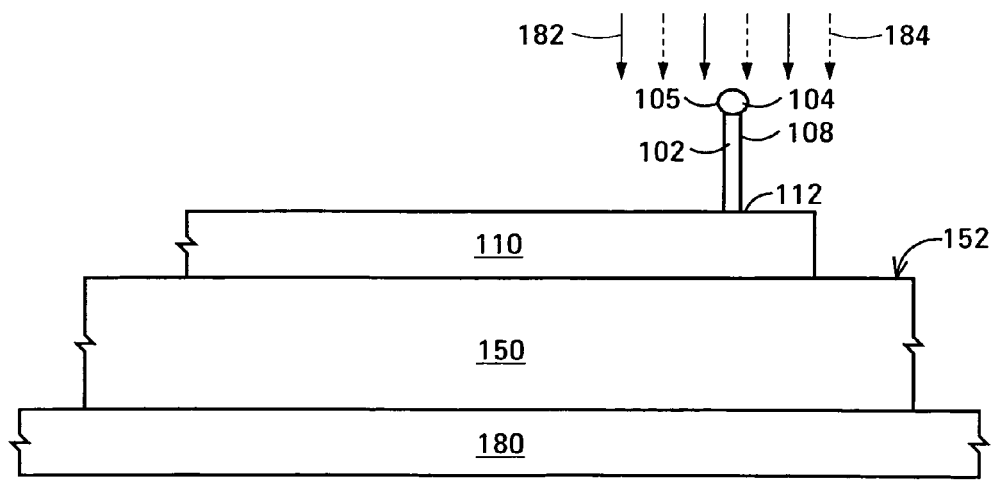

A semiconductor nanowire is then grown extending from the growth surface using the catalyst metal remaining on the growth surface as catalyst. FIGS. 5G and 5H show nanowire 102 being grown extending from growth surface 112 using catalyst metal 174 (FIG. 5F) remaining on the growth surface as catalyst in a vapor-liquid-solid growth process.

In an embodiment, handle wafer 150 is placed on the susceptor 180 of a chemical vapor deposition (CVD) reactor (not shown) and the susceptor and, hence, the handle wafer and the probe wafer, are heated to a deposition temperature near the eutectic point of an alloy between catalyst metal 174 and the semiconductor material from which nanowire 102 will be grown. In an embodiment in which catalyst metal 174 was gold and the semiconductor material from which nanowire 130 is grown was silicon, the susceptor was heated to a growth temperature of about 450° C.

A growth pressure is established inside the CVD reactor and a gaseous precursor mixture is passed over the probe wafer. In FIG. 5G, the gaseous precursor mixture is represented by solid arrows, an exemplary one of which is shown at 182. Reference numeral 182 will be used to refer to the gaseous precursor mixture. Gaseous precursor mixture 182 is composed of a substantially inert carrier gas and one or more precursors in a gaseous state. The precursors include a precursor for each constituent element of the semiconductor material of nanowire 102 and, optionally, a precursor for each dopant (typically only one dopant) for the semiconductor material of nanowire 102. In an embodiment in which the semiconductor material of nanowire 102 has a single constituent element, such as silicon, gaseous precursor mixture 182 is composed of the carrier gas, a precursor that comprises the single constituent element and, optionally, a precursor for the element with which the semiconductor material is doped. Exemplary precursors for silicon are silane ($SiH_4$) and disilane ($Si_2H_6$). An exemplary precursor for arsenic, a typical n-type dopant for silicon, is arsine ($AsH_3$). In an embodiment in which the bulk semiconductor material of nanowire 102 is a compound semiconductor, i.e., a semiconductor such as gallium arsenide (GaAs) having more than one constituent element, the gaseous precursor mixture is composed of the carrier gas, one or more precursors that collectively comprise the constituent elements of the compound semiconductor, and, optionally, a precursor for the element with the bulk semiconductor material is doped. Typically, such gaseous precursor mixture has a different precursor for each constituent element of the compound semiconductor material and the optional dopant. In an example in which the material of nanowire 102 was gallium arsenide, the precursors were trimethyl gallium (TMG) for gallium, arsine ($AsH_3$) for arsenic, and, optionally, silane ($SiH_4$) for silicon, a typical n-type dopant for gallium arsenide.

Further details of the growth of nanowire 102 will now be described with reference to an example in which the semiconductor material of nanowire 102 has a single constituent element, namely, silicon. The description below can readily be applied to the growth of a nanowire whose semiconductor material is a compound semiconductor. The precursor and adatoms of the dopant will not be mentioned in the following description.

Molecules of the precursor in gaseous precursor mixture 182 that contact catalyst metal 174 (FIG. 5F) are catalytically decomposed by the catalyst metal. Adatoms of the constituent element resulting from the decomposition of the precursor are deposited on the surface 178 of catalyst metal 174. The deposited adatoms mix with catalyst metal 174 to form an alloy, which has a lower melting point than the original catalyst metal. The alloy melts to form a molten catalyst nanoparticle 104 shown in FIG. 5G.

Molten catalyst nanoparticle 104 is also capable of catalytically decomposing the precursors in precursor mixture 182. Consequently, additional adatoms of the constituent element(s) are deposited on the surface 105 of catalyst nanoparticle 104 and increase the fraction of the constituent element in the alloy until the alloy becomes saturated with the constituent element. Then, further adatoms of the constituent element cause a corresponding number of atoms of the constituent element to be released from catalyst nanoparticle 104 at its surface adjacent growth surface 112. The released atoms grow epitaxially on the growth surface to form a solid nanowire 102 that extends orthogonally from the growth surface.

Further deposition of adatoms of the constituent element on molten catalyst nanoparticle 104 cause the release of additional atoms from the molten catalyst nanoparticle and an increase in the length of nanowire 102, as shown in FIG. 5H. The process of passing gaseous precursor mixture 182 over the probe wafer is continued until nanowire 102 reaches its design length. Molten catalyst nanoparticle 104 remains at the distal end of nanowire 102, remote from growth surface 112, throughout the nanowire growth process.

Nanowire 102 has a lateral surface 108 that, during the growth of the nanowire, is also exposed to gaseous precursor mixture 182. Some of the molecules of the precursor in gaseous precursor mixture 182 contact lateral surface 108 and decompose non-catalytically to deposit respective adatoms of the constituent element on lateral surface 108. Such adatoms accumulate on lateral surface 108. The rate of lengthways growth of nanowire 102 is substantially constant, so the time that an annular segment of lateral surface 108 is exposed to gaseous precursor mixture 182 is inversely proportional to the distance of the annular segment from growth surface 112. Consequently, adatoms accumulated on lateral surface 108 cause the cross-sectional area of nanowire 102 to increase towards growth surface 112. As a result, nanowire 102 has a tapered shape, rather than the non-tapered shape shown. If the taper is not severe, such a tapered shape is acceptable in some applications.

In applications in which the non-tapered shape of nanowire 102 shown in FIGS. 1A-1D is desirable, i.e., in which nanowire 102 has a uniform cross-sectional area along its length, a gaseous etchant is passed over the growth wafer in addition to precursor mixture 182. The gaseous etchant is represented in FIGS. 5G and 5H by broken arrows 184. Reference numeral 184 will be used to refer to the gaseous etchant. Gaseous etchant 184 removes the adatoms of the constituent element from lateral surface 108 by forming a volatile compound with the adatoms of the constituent element deposited on lateral surface 108. The volatile compound is volatile at the growth temperature and growth pressure established inside the CVD reactor. As the carrier gas that forms part of precursor mixture 182 passes over the probe wafer, it carries the molecules of the volatile compound away from lateral surface 108 into the exhaust system of the CVD reactor. The etch rate of the adatoms deposited on lateral surface 108 is several orders of magnitude greater than that of the crystalline material of the lateral surface itself. As a result, the gaseous etchant removes the adatoms but has a negligible etching effect on lateral surface 108.

In an embodiment, gaseous etchant 184 was a halogenated hydrocarbon, such as halogenated methane. In one example, the halogenated methane was carbon tetrabromide ($CBr_4$). In another example, the halogenated methane was carbon tetrachloride ($CCl_4$). Not all the hydrogen atoms of the halogenated hydrocarbon need be substituted. Moreover, ones of the hydrogen atoms may be replaced by different halogens. In another embodiment, gaseous etchant 184 was a hydrogen halide (HX), where X=fluorine (F), chlorine (Cl), bromine (Br) or iodine (I).

In another embodiment, gaseous etchant 184 is provided by using a halogen-containing precursor as the precursor for at least one of the constituent elements. The halogen-containing precursor forms part of gaseous precursor mixture 182 passed over the probe wafer. The halogen-containing precursor is catalytically decomposed at the surface 105 of nanoparticle 104. Adatoms of the constituent element are deposited on surface 105 and the halogen is released into the gaseous precursor mixture. The carrier gas carries the halogen released from the halogen-containing precursor to the lateral surface 108 of nanowire 102 as gaseous etchant 184. Additional halogen may be released by non-catalytic decomposition of the halogen-containing precursor at the lateral surface. At lateral surface 108, the halogen combines with adatoms newly-deposited on the lateral surface to form a volatile compound and the carrier gas carries the volatile compound away from the lateral surface.

Nanowire 102 is finally subject to an oxidation process that oxidizes the material of lateral surface 108. In an embodiment, handle wafer is heated and a stream of an oxidizing mixture comprising oxygen ($O_2$) and steam ($H_2O$) is passed over the surface of the probe wafer. The oxidizing mixture converts the silicon of lateral surface 108 to silicon dioxide ($SiO_2$). Alternatively, lateral surface 108 can be subject to other processes to make lateral surface 108 easier to coat with capture agent molecules.

The probe wafer in which the nanoscale FET probes including nanoscale FET probe 100 have been fabricated is then detached from handle wafer 150. In an embodiment, the probe wafer including nanoscale FET probe 100 is detached from handle wafer 150 by removing the clips (not shown) holding the wafers together.

In the above description, the probe wafer is detached from handle wafer 150 after nanowire 102 has been grown. Alternatively, the probe wafer can be detached from the handle wafer after sacrificial layer 160 has been removed but before nanowire 102 is grown. In this case, the probe wafer is placed directly on the susceptor 180 (FIG. 5G) of the CVD growth chamber.

In embodiments of the above method in which the probe wafer lacks apertures extending between its major surfaces, the handle wafer referred to above is unnecessary.

In embodiments of the above method in which the cantilever elements do not constitute part of a probe wafer, such cantilever elements may be mounted on the handle wafer (FIG. 5B) using double-sided adhesive tape. In an example, the double-sided adhesive tape was based on a polyimide film. After the sacrificial layer has been removed, leaving the catalyst metal on the growth surface, as described above with reference to FIG. 5F, the cantilever elements are removed from the handle wafer by carefully pulling them off the adhesive tape. The cantilever elements are then placed in appropriately-shaped recesses defined in the susceptor of the CVD growth chamber for the nanowire growth process described above with reference to FIGS. 5G and 5H. Alternatively, the cantilever elements may be mounted on the surface of an uncontoured susceptor using small clips.

An example of a method in accordance with an embodiment of the invention for making an embodiment of nanoscale FET probe 200 will be described next with reference to FIGS. 6A-6K. Multiple nanoscale FET elements similar to nanoscale FET element 260 described above with reference to FIGS. 2A and 2B are made at a time on a common wafer by a wafer-scale fabrication process. The nanoscale FET elements are then individually mounted on respective cantilever elements similar to cantilever element 210 described above with reference to FIGS. 2A and 2B.

FIGS. 6A-6J illustrate, and the following description describes, the fabrication of nanoscale FET element 260 on a portion of a wafer (not shown) constituting a substrate 250 on which the nanoscale FET element is fabricated. As the nanoscale FET element is fabricated, additional, similar nanoscale FET elements are fabricated on the wafer. FIG. 6K shows the final assembly of nanoscale FET probe 200 in which nanoscale FET element 260 is mounted on one end of cantilever element 210.

Figure 6A:
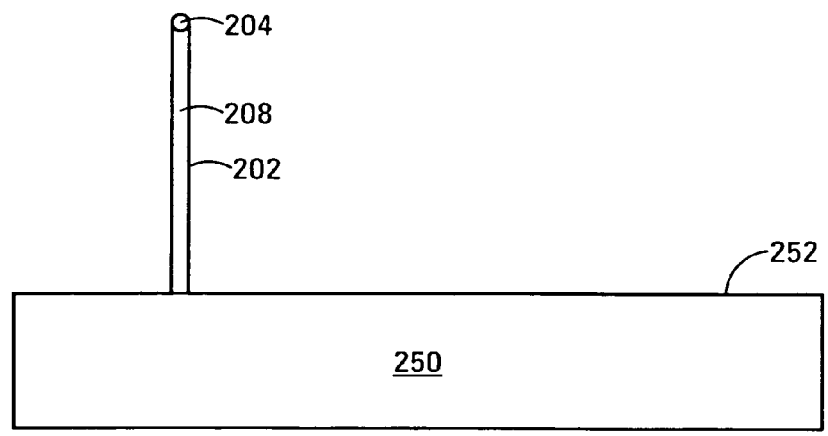
FIGS. 6A-6K schematically illustrate an example of a method in accordance with an embodiment of the invention for making an embodiment of the nanoscale FET probe shown in FIGS. 2A and 2B.

A catalyst nanoparticle 204 is deposited at a defined location on the growth surface 252 of substrate 250 and a doped semiconductor nanowire 202 is epitaxially grown extending substantially orthogonally from growth surface 252, as shown in FIG. 6A.

In an example, substrate 250 is a portion of a wafer of single-crystal silicon having a growth surface 252 aligned with the [111] crystalline plane of the underlying semiconductor material, and the material of catalyst nanoparticle 204 is gold. The single-crystal silicon is doped with a suitable impurity, such as arsenic (As), to make it electrically conducting. Other substrate materials may be used. Catalyst nanoparticle is deposited on the growth surface 252 of substrate 250 using any of the methods described above with reference to FIGS. 5C-5F or by any other suitable method. Nanowire 202 is grown using any of the methods described above with reference to FIGS. 5G and 5H, or by another suitable method. In an embodiment, the material of semiconductor nanowire 202 is doped silicon and nanowire 202 has a diameter in the range 50-150 nm and a length in the range 5-10 µm. In other embodiments, either or both the diameter and the length of nanowire 202 are outside the exemplified ranges.

Nanowire 202 is next subject to an oxidation process (not shown) that converts the material of lateral surface 208 from silicon to silicon dioxide ($SiO_2$). In an example, the wafer is heated and a stream of an oxidizing mixture comprising oxygen ($O_2$) and steam ($H_2O$) is passed over the surface of the wafer. The oxidizing mixture converts the silicon of lateral surface 208 to silicon dioxide ($SiO_2$). Alternatively, lateral surface 208 can be subject to other processes to provide lateral surface 208 with etch selectivity with respect to the silicon of substrate 250 and to make lateral surface 208 easier to coat with capture agent molecules.

Figure 6B:
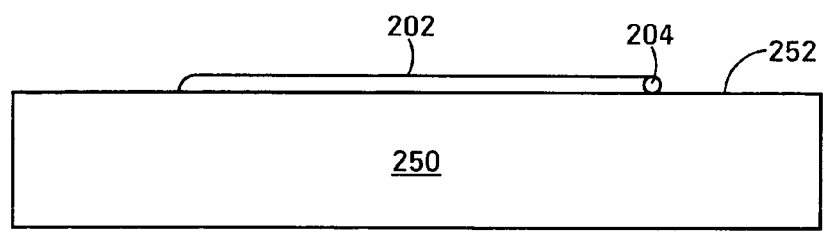

Nanowire 202 is then subject to an ion flux to change its orientation from orthogonal to growth surface 252 to parallel to growth surface 252, as shown in FIG. 6B. In an embodiment, ions of argon (Ar) with an energy in the range 1-5 keV and a flux density of $6 \times 10^{15}$ ions.cm$^{-2}$ are used to reorient nanowire 202.

A masking layer (not shown) is deposited on growth surface 252 and windows are defined in the masking layer to expose lengthways portions of nanowire 202 at both ends of nanowire 202. A majority of the length of nanowire 202 remains covered by the masking layer. The wafer is then subject to an etch process that removes the layer of silicon dioxide from the lateral surface 208 of the lengthways portions of the nanowire exposed by the windows in the masking layer. The masking layer is then removed. In an example, the masking layer is photoresist, the windows are defined by e-beam lithography, and the layer of silicon dioxide is removed by subjecting the wafer to a wet etch process using dilute hydrofluoric acid (HF) as the etchant. In another example, the layer of silicon dioxide is removed by subjecting the wafer to a dry etch process using HF vapor as the etchant.

Figure 6C:
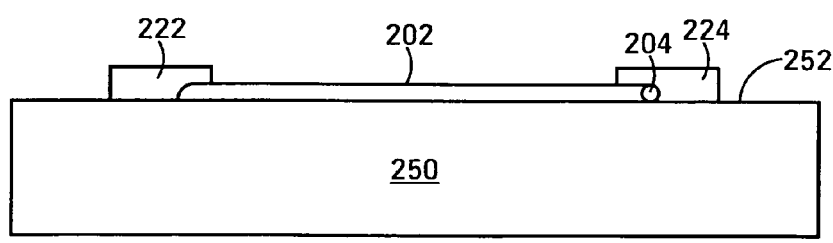

A layer of metal is deposited on growth surface 252 and is patterned to define electrode 222 that contacts the lengthways portion of nanowire 202 at one end of nanowire 202 and electrode 224 that contacts the lengthways portion of nanowire 202 at the other end of nanowire 202 and additionally contacts catalyst nanoparticle 204, as shown in FIG. 6C. A majority of the length of nanowire 202 is left uncovered by electrodes 222 and 224. Electrodes 222 and 224 electrically contact the lengthways portions of nanowire 202 from which the silicon dioxide layer was removed in the above-described etching process.

In an example in which the material of nanowire 202 is silicon, the metal deposited on growth surface 252 is an approximately 50 nm-thick layer of titanium (Ti) followed by an approximately 150 nm-thick layer of gold (Au). The metal is patterned using e-beam lithography, metal deposition and lift-off processes to define electrodes 222 and 224.

Figure 6D:
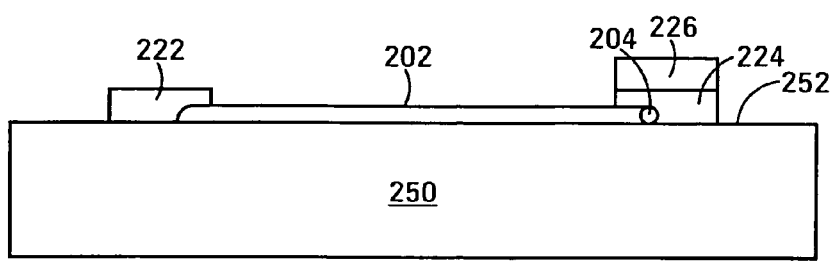

A layer of insulating material is deposited on growth surface 252 and is patterned to define insulator 226, as shown in FIG. 6D. In the example shown, insulator 226 covers electrode 224. In another example, insulator 226 covers electrode 222. In yet another example, a part of insulator 226 covers each of electrode 222 and electrode 224. In this last example, the thickness of the parts of insulator 226 covering electrodes 222 and 224 is approximately one half of that of insulator 226.

In an example, the insulating material deposited on growth surface 252 is an approximately 200-300 nm-thick layer of silicon oxide ($SiO_x$) or silicon nitride ($SiN_x$) and is patterned using e-beam lithography, insulating material deposition and lift-off processes to define insulator 226.

Figure 6E:
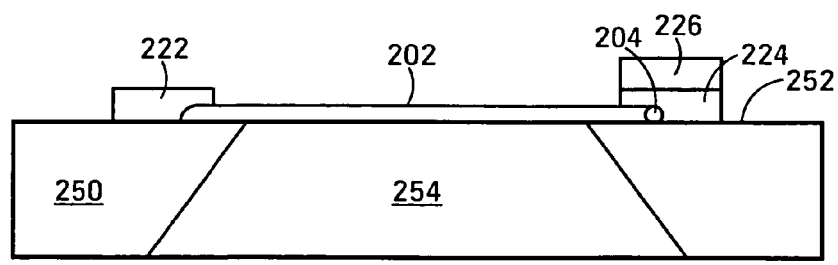

The wafer of which substrate 250 forms part is selectively etched from the back side of the wafer, i.e., from the surface opposite growth surface 252, to define a cavity 254 that extends through the thickness of the wafer, as shown in FIG. 6E. Cavity 254 is located such that it exposes the portion of nanowire 202 between electrodes 222 and 224 from the back side of the wafer. The wafer may be subject to a thickness reduction process before the etch is performed to reduce the time needed to perform the etch. In an example, the etch is a wet etch using potassium hydroxide (KOH) as the etchant. In another embodiment, the etch is a dry etch using bromotrifluoromethane ($CF_3Br$) or a mixture of hydrogen bromide (HBr) and nitrogen trifluoride ($NF_3$) as the etchant.

Figure 6F:
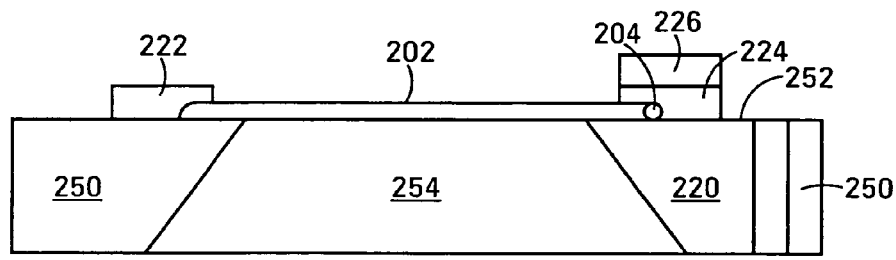
Figure 6G:
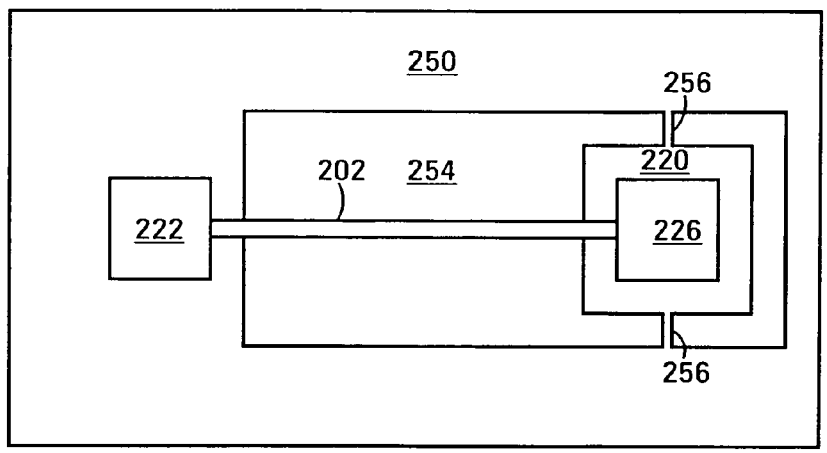
Figure 6H:
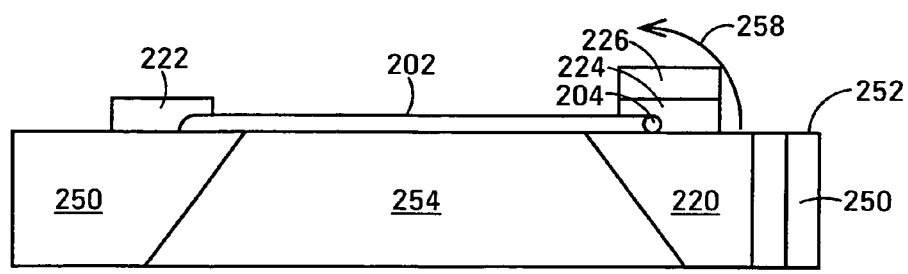

The wafer of which substrate 250 forms part is subject to a second selective etch from its back side to define mounting block 220 in substrate 250, as shown in FIG. 6F and the plan view shown in FIG. 6G. A deep reactive ion etch (DRIE) process is used to perform this etch. Typically, the etch is patterned to leave mounting block 220 connected to the remainder of substrate 250 by narrow beams 256. In an example, the deep reactive ion etch is performed using sulfur hexafluoride ($SF_6$) and octofluorobutane ($C_4F_8$) at a pressure in the range of 0.25-10 Pa as the etchant. In silicon, these etch conditions provide an etch rate in the range of 1.5-4 µm/min, an etch selectivity with respect to photoresist of 100 to 1 and an etch selectivity with respect to silicon dioxide ($SiO_2$) of 200 to 1.

Figure 6I:
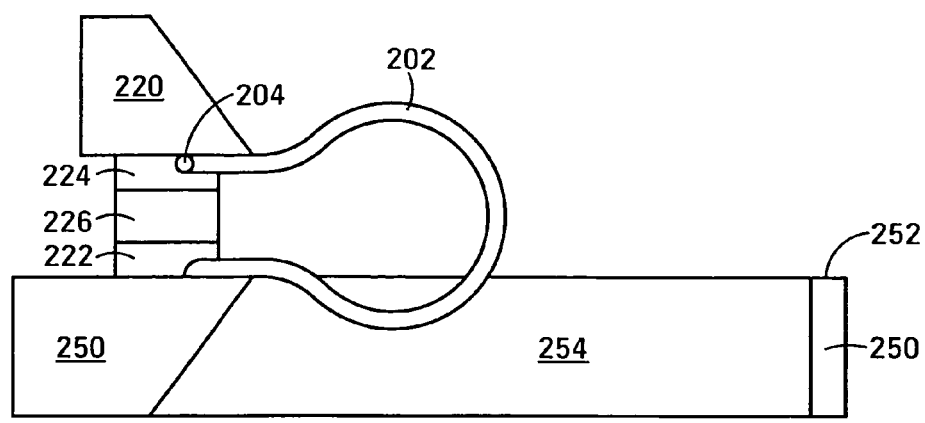

A layer of adhesive (not shown) is applied to electrode 222. Beams 256 connecting mounting block 220 to substrate 250 are broken and mounting block 220 is moved in the direction indicated by arrow 258 shown in FIG. 6H to bring insulator 226 into contact with the adhesive on electrode 222, as shown in FIG. 6I. The adhesive is then cured.

Moving mounting block 220 to bring insulator 226 into contact with electrode 222 forms nanowire 202 into a loop and brings the opposite ends of nanowire 202 into proximity.

Figure 6J:
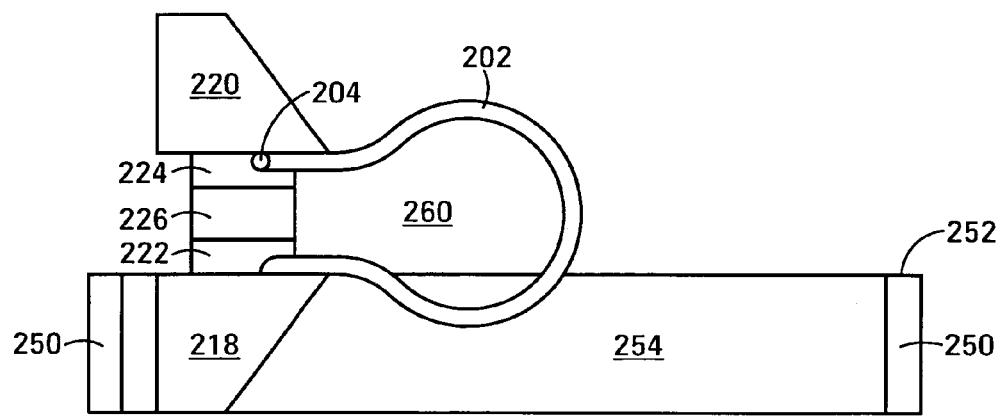
Figure 6K:
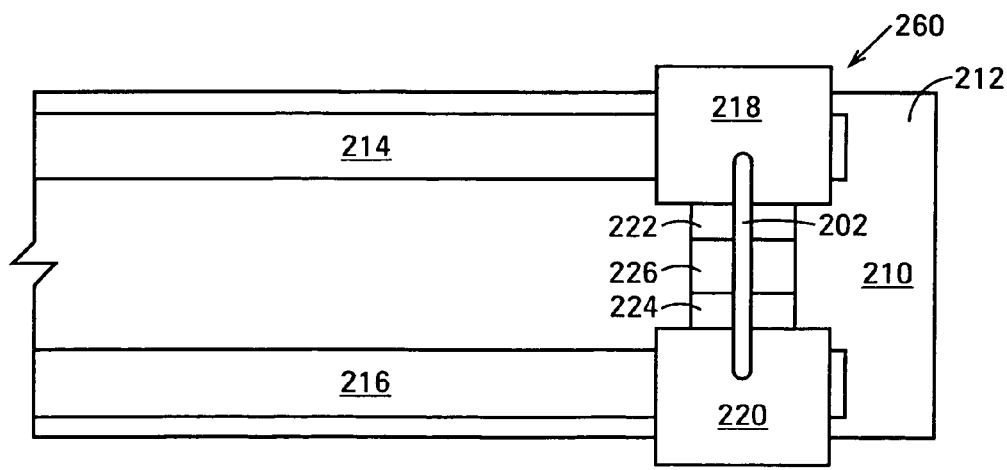

The wafer of which substrate 250 forms part is subject to a third selective etch from its back side to define mounting block 218 in substrate 250, as shown in FIG. 6J. This completes the fabrication of nanoscale FET element 260. A deep reactive ion etch (DRIE) process is used to perform this etch. Typically, the etch is patterned to leave mounting block 218, and, hence, nanoscale FET element 260, connected to the remainder of substrate 250 by narrow beams (not shown, but similar to beams 256). In an embodiment, the deep reactive ion etch process is similar to that described above with reference to FIGS. 6F and 6G.

A wafer of cantilever elements similar to cantilever element 210 is provided, as described above with reference to FIG. 5A. A layer of metal is deposited on the surface of the wafer to cover the surface 212 of cantilever element 210. The metal is patterned to define electrical traces 214 and 216 running lengthwise along the external surface 212 of cantilever element 210, as shown in FIG. 6K. In an example, the metal deposited on external surface 212 is an approximately 50 nm-thick layer of titanium (Ti) followed by an approximately 150 nm-thick layer of gold (Au). The metal is patterned using e-beam lithography, metal deposition and lift-off processes to define electrical traces 214 and 216.

Nanoscale FET element 260 is released from the wafer in which it has been fabricated. Nanoscale FET element 260 is typically released by breaking the beams similar to beams 256 (FIG. 6G) that connect mounting block 218 to substrate 250. Nanoscale FET element 260 is then affixed to cantilever element 210 adjacent one end thereof with mounting blocks 218 and 220 in physical and electrical contact with electrical traces 214 and 216, as shown in FIG. 6K. This completes fabrication of nanoscale FET probe 200 described above with reference to FIGS. 2A and 2B.

Nanoscale FET probe 200 may be made in ways other than that just described. FIGS. 7A-7H show one alternative in which nanowire 202 is grown epitaxially on the growth surface 212 of cantilever element 210 and the direction of growth of nanowire 202 is changed twice during the growth process to form looped nanowire 202. In this method, the semiconductor material of cantilever element 210 is doped so that cantilever element 210 is electrically conducting.

Figure 7A:
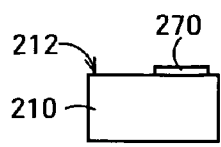
FIGS. 7A-7H schematically illustrate an example of a method in accordance with another embodiment of the invention for making an embodiment of the nanoscale FET probe shown in FIGS. 2A and 2B.

A layer of insulating material is deposited on the growth surface 212 of cantilever element 210 and is patterned to define an insulator 270, as shown in FIG. 7A. Insulator 270 extends along the length and part-way across the width of cantilever element 210. In an example, the insulating material is silicon dioxide deposited by chemical vapor deposition (CVD) and patterned by a wet etch process in which dilute hydrofluoric acid (HF) is used as the etchant.

Figure 7B:
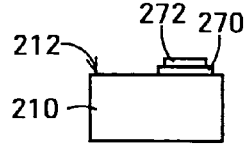

A layer of metal is deposited on insulator 270 and on the growth surface 212 of cantilever element 210 and is patterned to define an electrical trace 272, as shown in FIG. 7B. Electrical trace 272 extends along the length and part-way across the width of insulator 270. In an example, the metal deposited on growth surface 212 is an approximately 50 nm-thick layer of titanium (Ti) followed by an approximately 150 nm-thick layer of gold (Au). The metal is patterned using e-beam lithography, metal deposition and lift-off processes to define electrical trace 272. Cantilever element 210 and electrical trace 272 provide electrical connections to respective ends of nanowire 202.

Figure 7C:
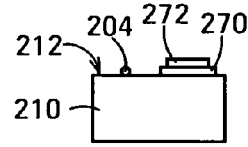
Figure 7D:
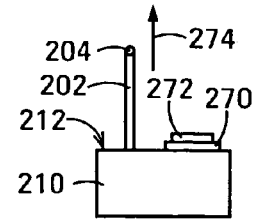

Catalyst nanoparticle 204 is deposited on the growth surface 212 of cantilever element 210 at a location near one end of cantilever element 210 and offset widthwise from the centerline of the cantilever element, as shown in FIG. 7C. Any of the deposition methods described above with reference to FIGS. 5B-5F or another suitable method can be used to deposit catalyst nanoparticle 204. A first segment of semiconductor nanowire 202 is grown extending from growth surface 212 at the location of catalyst nanoparticle 204, as shown in FIG. 7D. The direction of growth of the first segment of nanowire 202 is indicated with arrow 274. The growth method described above with reference to FIGS. 5G and 5H, or any other suitable method, may be used to grow nanowire 202.

Once the first segment of nanowire 202 extends to a desired distance from growth surface 212, as shown in FIG. 7D, the growth conditions are changed to destabilize the above-described vapor-liquid-solid growth process. It is known in the art that subjecting a molten catalyst nanoparticle to a lateral temperature gradient can change the morphology of the solid-liquid interface and change the direction of growth of the nanowire. In *Mechanism of Branching and Kinking during VLS Crystal Growth*, 115 J. ELECTROCHEM SOC., 93 (1968), the disclosure of which is incorporated by reference, R. S. Wagner and C. J. Doherty report observing kinking of a silicon nanowire from the [111] crystallographic direction to the [−111] direction when the right side of the growing nanowire is exposed to higher temperature than the left side. The kinking resulted from a change in the direction of growth of about 70°.

Figure 7E:
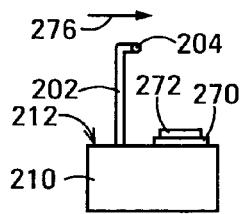

During the growth of nanowire 202, the temperature conditions are changed from isothermal to non-isothermal to destabilize the growth process and change the direction of growth of nanowire 202 from the [111] direction to an appropriate one of the [−110], [10−1], [1−10], [01−1], [−101] and [0−11] directions, all of which are orthogonal to the [111] direction. This causes the direction of growth of nanowire 202 to change from growth direction 274 orthogonal to growth surface 212 to a growth direction 276 parallel to growth surface 212. After the growth direction has changed to growth direction 276, growth conditions are restored to isothermal, and a second segment of nanowire 202 is grown in growth direction 276 parallel to growth surface 212, as shown in FIG. 7E. Alternatively, growth direction 276 may be non-orthogonal to growth direction 274.

Figure 7F:
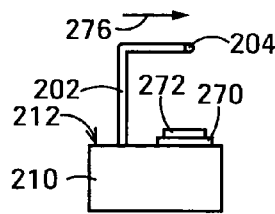
Figure 7G:
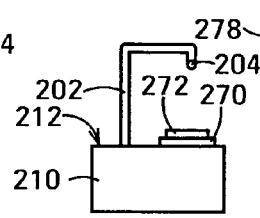

Once the second segment of nanowire 202 has a desired extent in the direction parallel to growth surface 212, as shown in FIG. 7F, the growth conditions are once more changed to non-isothermal to destabilize the vapor-liquid-solid growth process. The resulting instability causes the direction of growth of nanowire 202 to change from growth direction 276 parallel to growth surface 212 to a growth direction 278 orthogonal to and towards growth surface 212. After the growth direction has changed to growth direction 278, growth conditions are restored to isothermal, and a third segment of nanowire 202 is grown extending towards growth surface 212, as shown in FIG. 7G. Alternatively, growth direction 278 may be non-orthogonal to growth direction 276.

Figure 7H:
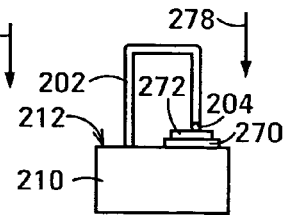

Growth of the third segment of nanowire 202 continues until catalyst nanoparticle 204 contacts electrical trace 272, as shown in FIG. 7H. Catalyst nanoparticle 204 contacting electrical trace 272 completes an electrical circuit that includes cantilever element 210, nanowire 202 and electrical trace 272, and completes the fabrication of this embodiment of nanoscale FET probe 200. Suitably directed beams of ions may be used in conjunction with destabilizing the growth process to help define the direction of growth taken by nanowire 202 after the growth process has been destabilized.

FIGS. 8A-8H show another alternative way of making an embodiment of nanoscale FET probe 200 in which nanowire 202 is grown epitaxially on the growth surface 212 of cantilever element 210 and the direction of growth of nanowire 202 is changed only once during the growth process to form looped nanowire 202. Causing the direction of growth of the nanowire to change on demand and in a desired direction is quite difficult to achieve using current processing technology. The method shown in FIGS. 8A-8H halves the number of times this has to be done In the method shown in FIGS. 8A-8H, cantilever element 210 is provided. The semiconductor material of cantilever element 210 is doped so that cantilever element 210 is electrically conducting. A deep groove 286 is etched running lengthways down the center of the cantilever element. A wet etch process using potassium hydroxide (KOH) as etchant is used so that the etch forms a growth surface 282 and an opposite surface 284. Opposite surface 284 is approximately orthogonal to growth surface 282. Growth surface 282 and opposite surface 284 each correspond to a respective one of the crystalline planes of the silicon semiconductor material of cantilever element 210.

Figure 8A:
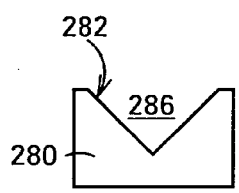
FIGS. 8A-8H schematically illustrate an example of a method in accordance with another embodiment of the invention for making an embodiment of the nanoscale FET probe shown in FIGS. 2A and 2B.
Figure 8B:
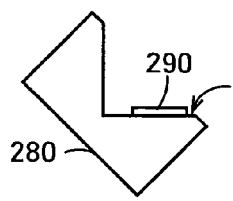

Cantilever element 210 is rotated about its long axis to orient opposite surface 284 approximately horizontally. A layer of insulating material is deposited on the opposite surface 284 of cantilever element 210 and is patterned to define an insulator 290, as shown in FIG. 8B. Insulator 290 extends along the length and part-way across the width of opposite surface 284. In an example, the insulating material is silicon dioxide deposited by chemical vapor deposition (CVD) and patterned by a wet etch process in which dilute hydrofluoric acid (HF) is used as the etchant.

Figure 8C:
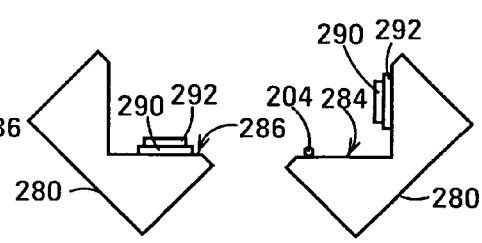

A layer of metal is deposited on insulator 290 and on the opposite surface 284 of cantilever element 210 and is patterned to define an electrical trace 292, as shown in FIG. 8C. Electrical trace 292 extends along the length and part-way across the width of insulator 290. In an example, the metal deposited on insulator 290 and opposite surface 284 is an approximately 50 nm-thick layer of titanium (Ti) followed by an approximately 150 nm-thick layer of gold (Au). The metal is patterned using e-beam lithography, metal deposition and lift-off processes to define electrical trace 292. Cantilever element 210 and electrical trace 292 provide electrical connections to respective ends of nanowire 202.

Figure 8D:
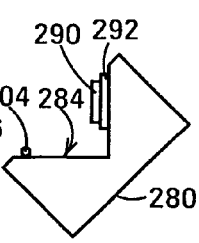

Cantilever element 210 is rotated about its long axis to orient growth surface 282 approximately horizontally. Catalyst nanoparticle 204 is deposited on growth surface 282 at a location near one end of cantilever element 210 and offset widthwise from the centerline of growth surface 282, as shown in FIG. 8D. Any of the deposition methods described above with reference to FIGS. 5B-5F can be adapted to deposit catalyst nanoparticle on growth surface 282, or another suitable method may be used.

Figure 8E:
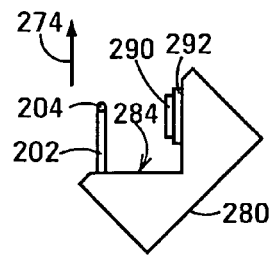

A first segment of semiconductor nanowire 202 is grown extending from growth surface 282 at the location of catalyst nanoparticle 204, as shown in FIG. 8E. The direction of growth of the first segment of nanowire 202 is indicated by arrow 274. The growth method described above with reference to FIGS. 5G and 5H, or any other suitable method, may be used to grow nanowire 202.

Figure 8F:
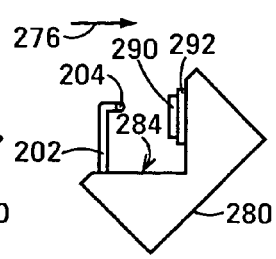

Once the first segment of nanowire 202 extends to a desired distance from growth surface 282, as shown in FIG. 8E, the growth conditions are changed to non-isothermal to destabilize the above-described vapor-liquid-solid growth process, as described above. The resulting instability causes the direction of growth of nanowire 202 to change from growth direction 274 orthogonal to growth surface 282 to a growth direction 276 parallel to growth surface 282. Alternatively, growth direction 276 may be non-orthogonal to growth direction 274. After the growth direction has changed to growth direction 276, growth conditions are restored to isothermal, and a second segment of nanowire 202 is grown in growth direction 276 parallel to growth surface 282, as shown in FIG. 8F.

Figure 8G:
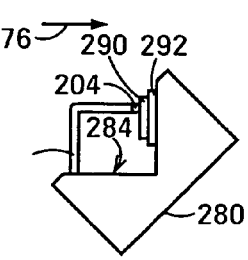
Figure 8H:
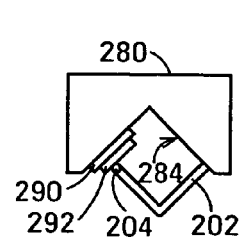

Growth of the second segment of nanowire 202 continues until catalyst nanoparticle 204 contacts electrical trace 292, as shown in FIG. 8G. Catalyst nanoparticle 204 contacting electrical trace 292 completes an electrical circuit that includes cantilever element 210, nanowire 202 and electrical trace 292. The completed embodiment of nanoscale FET probe 200 is shown in FIG. 8H. A suitably directed beam of ions may be used in conjunction with destabilizing the growth process to help define the direction of growth taken by nanowire 202 after the growth process has been destabilized.

In another alternative, a nanoscale FET element that forms part of nanoscale FET probe 200 can be fabricated by a method based on the process described by Shan et al. in *From Si Source Gas Directly to Positioned, Electrically Contacted Si Nanowires: The Self-Assembling "Grow in Place" Approach*, 4 NANO LETTERS, 2085-2089 (2004), the disclosure of which is incorporated by reference. In this alternative, Shan's process is modified to use a sacrificial/catalyst metal nanowire that is looped instead of straight. Such looped nanowire define a looped channel in the template that defines the direction of growth of the nanowire. A nanowire grown in the looped channel using a residual portion of the sacrificial/catalyst metal as catalyst grows with a looped shape, and can therefore be used as looped nanowire 202.

This disclosure describes the invention in detail using illustrative embodiments. However, the invention defined by the appended claims is not limited to the precise embodiments described.

We claim:

1. A method for performing a measurement inside a specimen, the method comprising:
   providing nanoscale FET probe comprising a cantilever element and a nanowire extending from the cantilever element, the nanowire electrically connected to the cantilever element at at least one of the ends of the nanowire;
   coating the nanowire along at least part of the length thereof with molecules of a capture agent;
   moving the cantilever element to insert the nanowire into the specimen; and
   monitoring an electrical property of the nanoscale FET probe to detect binding events between the capture agent molecules and an analyte of interest inside the specimen.

2. The method of claim 1, in which the monitoring comprises monitoring conductivity of the nanoscale FET probe.

3. The method of claim 1, in which the moving comprises:
   providing an atomic force microscope;
   mounting the cantilever element in the atomic force microscope; and
   operating the atomic force microscope to move the cantilever element.

4. The method of claim 1, in which the moving comprises penetrating the specimen on a single side thereof.

5. The method of claim 4, in which:
   the nanowire is looped; and
   the nanowire is electrically connected to the cantilever element at both ends of the nanowire.

6. The method of claim 1, in which the moving comprises penetrating the specimen on opposite sides thereof.

7. The method of claim 6, in which:
   the nanowire extends substantially in a straight line from the cantilever element;
   the method additionally comprises:
      providing an auxiliary conductive surface, and
      placing the specimen on the auxiliary conductive surface;
   the moving additionally comprises contacting the auxiliary conductive surface with the distal end of the nanowire, remote from the cantilever element, to establish an electrical circuit that includes the nanowire.

8. The method of claim 7, in which the monitoring comprises monitoring the electrical property of the nanoscale FET probe via the electrical circuit.

* * * * *